(12) United States Patent
Rai et al.

(10) Patent No.: US 9,146,931 B2
(45) Date of Patent: Sep. 29, 2015

(54) REMOTELY DEBUGGING METADATA OF FILESYSTEM WITHOUT ACCESSING USER DATA OF FILESYSTEM

(75) Inventors: Devesh K. Rai, Beaverton, OR (US); Ninad S. Palsule, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 2252 days.

(21) Appl. No.: 11/855,522

(22) Filed: Sep. 14, 2007

(65) Prior Publication Data

US 2009/0077003 A1    Mar. 19, 2009

(51) Int. Cl.
- *G06F 7/00*    (2006.01)
- *G06F 17/30*    (2006.01)
- *G06F 11/07*    (2006.01)

(52) U.S. Cl.
CPC ........ *G06F 17/3012* (2013.01); *G06F 11/0727* (2013.01); *G06F 11/0748* (2013.01); *G06F 11/0793* (2013.01); *G06F 17/3007* (2013.01)

(58) Field of Classification Search
USPC ....................................................... 707/200
See application file for complete search history.

(56) References Cited

U.S. PATENT DOCUMENTS

| | | | | |
|---|---|---|---|---|
| 6,742,134 | B1 * | 5/2004 | Pothier et al. | 714/4 |
| 6,983,362 | B1 * | 1/2006 | Kidder et al. | 713/1 |
| 7,117,483 | B2 | 10/2006 | Dorr et al. | |
| 2002/0091763 | A1 * | 7/2002 | Shah et al. | 709/203 |
| 2003/0081003 | A1 | 5/2003 | Kutay et al. | |

OTHER PUBLICATIONS

User Guide for Zend Studio 5.5 for i5/OS, copyright 1999-2007, i5/OS version issued Jan. 2007, accessed from Internet web site www.zend.com.

* cited by examiner

*Primary Examiner* — Ajith Jacob
(74) *Attorney, Agent, or Firm* — Steven Bennett

(57) ABSTRACT

Metadata is extracted from a filesystem of a first system. The filesystem includes user data and the metadata. The metadata relates to the user data and is corrupt. Just the just the metadata extracted from the filesystem is transmitted from the first system to a second system. The second system receives the transmitted metadata, and loads this metadata to create a dummy namespace reflecting the metadata. The second system debugs the metadata, and prepares a patch based on this debugging. Execution of the patch allows the metadata to be repaired so that the metadata is no longer corrupt. The patch is transmitted from the second system to the first system for execution at the first system to allow the metadata to be repaired at the first system so that the metadata is no longer corrupt at the first system.

20 Claims, 5 Drawing Sheets

REMOTELY DEBUGGING METADATA OF FILESYSTEM WITHOUT ACCESSING USER DATA OF FILESYSTEM

FIELD OF THE INVENTION

The present disclosure relates generally to a filesystem having user data and metadata relating to the user data, and more particularly to debugging and repairing the metadata of the filesystem where the metadata is corrupt.

BACKGROUND OF THE INVENTION

A filesystem defines the methodology by which files of user data are stored on and retrieved from storage devices like hard disk drives. The user data of a file system is the actual data that users may create and/or access. A file system also includes metadata relating to this user data. The metadata includes data regarding the user data that is not part of the user data itself. For instance, the metadata may include the filenames of the files encompassing the user data, the sizes of these files, and read/write attributes of these files. A filesystem thus can be considered as defining the directory structure for tracking these files and the path syntax needed to access them.

The metadata of a filesystem can become corrupt for a number of different reasons. The filesystem itself may be relatively immature, such that it has not been developed properly, resulting in eventual corruption of the metadata. Rogue computer programs may corrupt the metadata of a filesystem. A user may somehow corrupt the metadata of a filesystem as well. In these and other situations, while the metadata becomes corrupt, the user data itself may remain uncorrupted, although the user data may not be able to be properly accessed because the metadata is corrupt.

Traditionally, repairing the metadata of a filesystem has involved a technician directly accessing the system of which the filesystem is a part, and repairing the metadata directly at this system using, for instance, a metadata checking utility. However, this approach is problematic for at least three reasons. First, the system may be a production system that is currently being used in a way that prevents the metadata from being repaired without taking the system offline for a lengthy period of time. Second, security policies regarding the user data stored within the filesystem of this system may prohibit access of the user data by unauthorized personnel, which may include the technician that is supposed to repair the metadata. Third, the metadata checking utility may not currently be able to correct the corruption within the metadata.

Furthermore, simply repairing the metadata of the filesystem so that the metadata is no longer corrupt may not prevent the metadata becoming corrupt in the future. For example, there may be an underlying problem with the filesystem itself that may cause the metadata to become corrupt again. For these and other reasons, there is a need for the present disclosure.

SUMMARY OF THE INVENTION

The present disclosure relates to remotely debugging the metadata of a filesystem without accessing the user data of the file system. A method of one embodiment of the present disclosure is performed at a first system and at a second system. At both systems, the method may be implemented as one or more computer programs stored on a computer-readable medium, such as a tangible computer-readable medium like a recordable data storage medium, or an intangible computer-readable medium like a modulated carrier signal.

At the first system, the method extracts the metadata from the filesystem of the first system. The filesystem includes user data to which the metadata relates. The metadata is corrupt. The method transmits just the metadata extracted from the filesystem of the first system, to the second system.

At the second system, the metadata as extracted from the filesystem of the first system is received and is debugged. The method prepares a patch based on this debugging, such that execution of the patch allows the metadata to be repaired so that the metadata is no longer corrupt. The patch is transmitted from the second system to the first system for execution at the first system to allow the metadata to be repaired at the first system so that the metadata is no longer corrupt at the first system.

A system of one embodiment of the present disclosure includes at least a filesystem and a mechanism. The filesystem includes user data and metadata. The metadata relates to the user data and is corrupt. The mechanism extracts the metadata from the filesystem and transmits just the metadata to a remote system for debugging. The mechanism receives a patch from the remote system and executes the patch to allow the metadata to be repaired. The user data of the filesystem is inaccessible to the second system, and users of the second system are prevented from accessing the user data of the filesystem.

Furthermore, in one embodiment, the patch can include modifications made to the filesystem itself so that the metadata does not become corrupt in the future for the same reason that the metadata initially became corrupt at the first system. As such, execution of the patch at the first system repairs the filesystem at the first system so that the metadata does not become corrupt in the future for the same reason that the metadata initially became corrupt at the first system. The patch may also include modifications made to a metadata checking utility so that this utility is able to repair the metadata so that the metadata is no longer corrupt at the first system. The patch is executed at the first system to update the metadata checking utility at the first system, and then the metadata checking utility as updated is executed to repair the metadata so that the metadata is no longer corrupt at the first system.

Embodiments of the present disclosure provide for advantages over the prior art. The user data at the first system can remain inaccessible to the second system and the metadata nevertheless debugged. This is because just the metadata is transmitted from the first system to the second system, preserving confidentiality of the user data at the first system because none of the user data is transmitted along with the metadata. Likewise, a user of the second system can be prevented from directly accessing the first system, such that he or she is unable to directly repair the metadata at the first system. However, the user is still able to remotely debug the metadata, at the second system, and then transmit a patch for execution at the first system to allow the metadata to be repaired at the first system.

Furthermore, embodiments of the present disclosure enable the root or underlying cause of metadata corruption to be corrupted. The patch that is prepared at the second system for transmission to and execution at the first system can include modifications to the filesystem that prevent the metadata from being corrupted at the first system for the same reason that had resulted in the metadata initially becoming corrupted. In addition, the patch may include modifications to a metadata checking utility so that the utility can be updated at the first system in order for the utility to be able to repair the corruption to the metadata. Still other advantages, aspects, and embodiments of the present disclosure will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the present disclosure, and not of all embodiments of the disclosure, unless otherwise explicitly indicated, and implications to the contrary are otherwise not to be made.

DETAILED DESCRIPTION OF THE INVENTION

In the following detailed description of exemplary embodiments of the present disclosure, reference is made to the accompanying drawings that form a part hereof, and in which is shown by way of illustration specific exemplary embodiments in which the present disclosure may be practiced. These embodiments are described in sufficient detail to enable those skilled in the art to practice the present disclosure. Other embodiments may be utilized, and logical, mechanical, and other changes may be made without departing from the spirit or scope of the present disclosure. The following detailed description is, therefore, not to be taken in a limiting sense, and the scope of the present disclosure is defined only by the appended claims.

Overview

Figure 1:
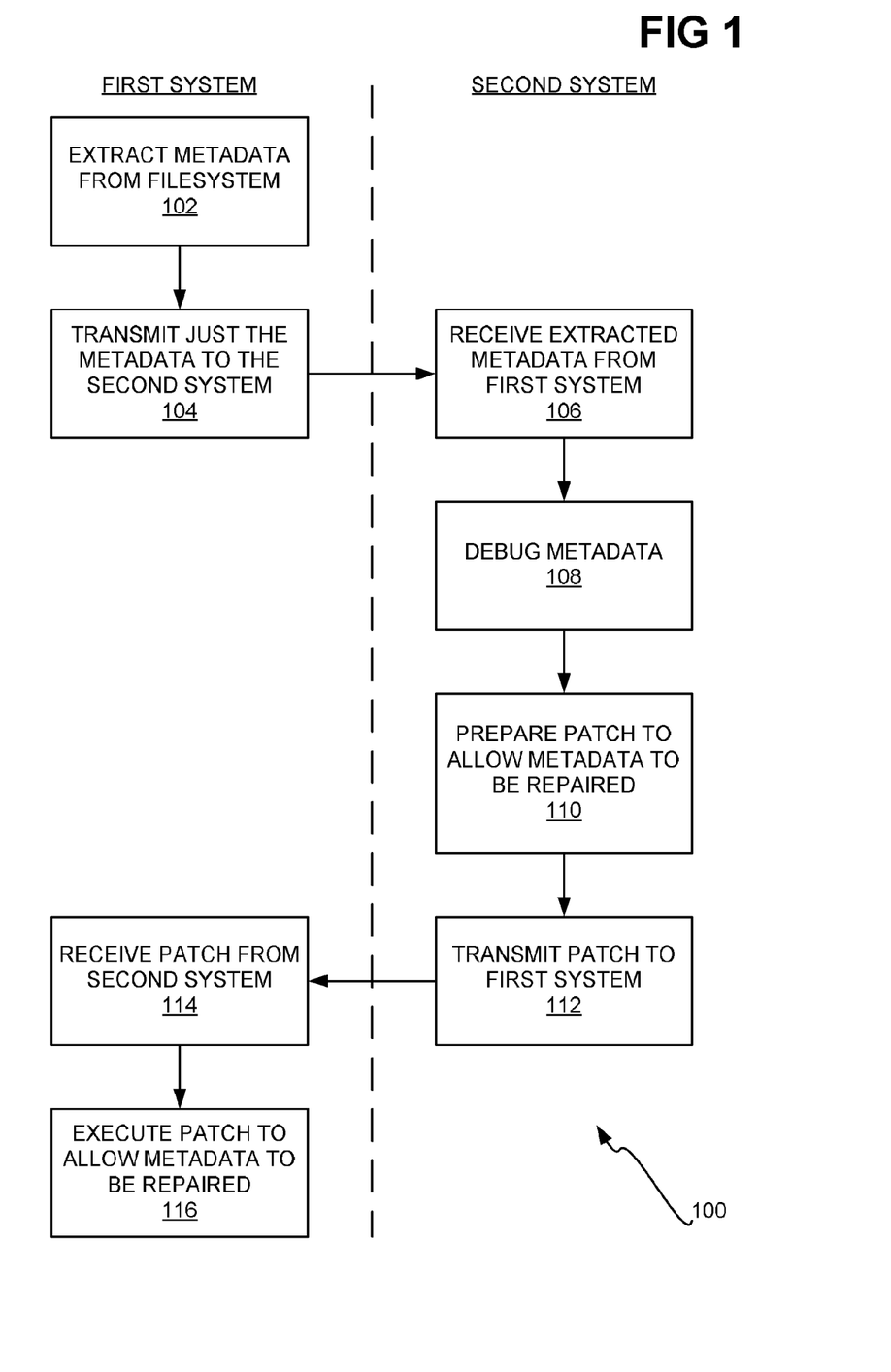
FIG. 1 is a flowchart of a method, according to an embodiment of the present disclosure.

FIG. 1 shows a method 100, according to an embodiment of the present disclosure. The parts of the method 100 in the left-hand column of FIG. 1 are performed at a first system. This may be an online production system, for instance, that is currently and actively being used to perform various functionality. The first system may include a filesystem having user data and metadata relating to the user data. The metadata is presumed to be corrupted in the context of method 100. The first system may be such that metadata cannot be directly repaired without affecting the performance of the functionality performed at the first system and/or without having to take the first system offline for an extended length of time. The first system may further be secured such that personnel that are to repair the metadata cannot directly access the first system, so that such personnel do not have access to the user data, to preserve confidentiality of the user data.

As has been described, the user data of a file system is the actual data that users may create and/or access. The metadata of a file system, by comparison, includes data regarding the user data that is not part of the user data itself. For instance, the metadata may include the filenames of the files encompassing the user data, the sizes of these files, read/write attributes of these files, locations of these file on physical storage devices such as hard disk drives, and so on. A filesystem thus can be considered as defining the directory structure for tracking these files and the path syntax needed to access them.

The parts of the method 100 in the right-hand column of FIG. 1 are performed at a second system different than the first system. The second system may be within a laboratory environment, for instance, or otherwise may be a non-production system. The second system may be a remote system in which personnel, such as technicians, are able to test, modify, and debug features that ultimately will be deployed in the first system. As such, no confidential user data, for instance, may be stored at the second system.

The corrupt metadata of the filesystem is extracted from the filesystem at the first system (102). As such, if the metadata were not previously separate from the user data of the file system, the extraction process results in the metadata being separate from the user data. Those of ordinary skill within the art can appreciate that extraction can be performed as is conventionally achieved, or in any other manner. Thereafter, just the metadata is transmitted from the first system to the second system (104), which receives the extracted metadata (106). It is noted that none of the user data is transmitted from the first system to the second system. Therefore, where applicable the confidentiality of the user data at the first system is preserved.

The corrupt metadata is debugged at the second system to determine why the metadata became corrupt (108). For example, in one embodiment, a technician or another type of personnel may manually interact with the second system to determine why the metadata became corrupt. However, embodiments of the present disclosure encompass other types of debugging to determine why the metadata became corrupt, such as employing computer-executed tools that automatically determine such causes of metadata corruption, with little or no interaction by users at the second system.

Once the debugging process has been completed, a patch is prepared based on the debugging that has been performed (110). The patch may be an executable file that when executed at a system allows the metadata to be repaired at this system. For instance, the executable file can be executed at the first system so that the metadata is able to be repaired at the first system. Therefore, the patch is transmitted from the second system to the first system (112), which receives the patch (114). The patch is then executed at the first system to allow the metadata to be repaired at the first system.

In this way, metadata of the file system at the first system can be debugged at least substantially without having to have personnel work directly at the first system. Security and confidentiality of the user data at the first system is maintained because the personnel at the second system do not have direct access to the first system. Rather, the personnel work solely at the second system, to which the first system is inaccessible. The personnel may have indirect access to the second system, insofar as, for instance, they may be in communication with a user at the first system to instruct the user what to do. As such, the personnel still do not have access of the user data at the first system, insofar as the user at the first system does not provide this user data to the personnel.

In addition, investigating the metadata at the second system to determine why the metadata became corrupt can mean that the first system can remain online, and does not have to be taken offline, during this process. Rather, the first system may only have to be taken offline to execute the patch in part 116, if the first system has to be taken offline at all.

Technical Background (Systems)

Figure 2A:
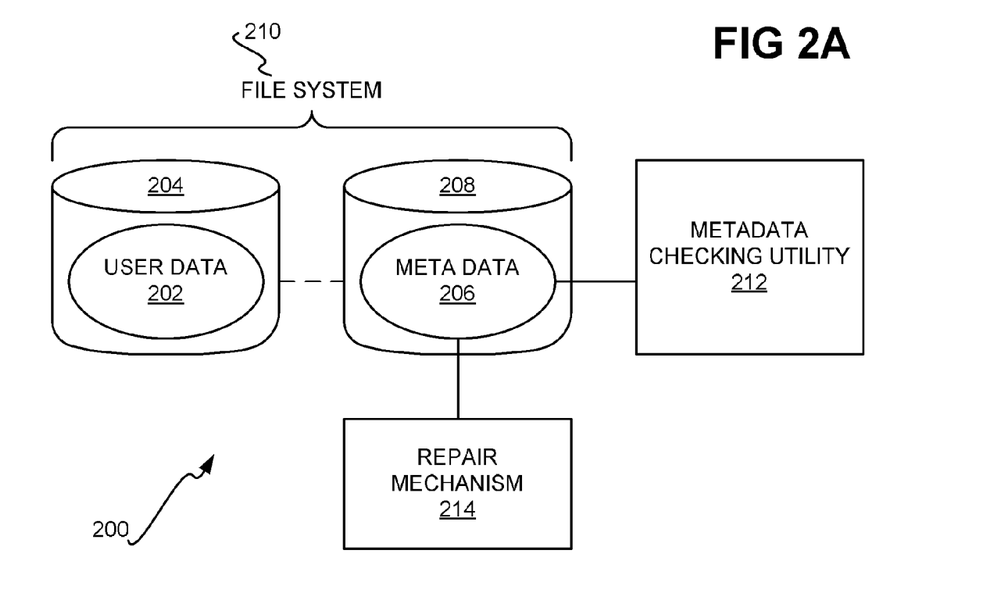
FIGS. 2A and 2B are diagrams of system, according to varying embodiments of the present disclosure.
Figure 2B:
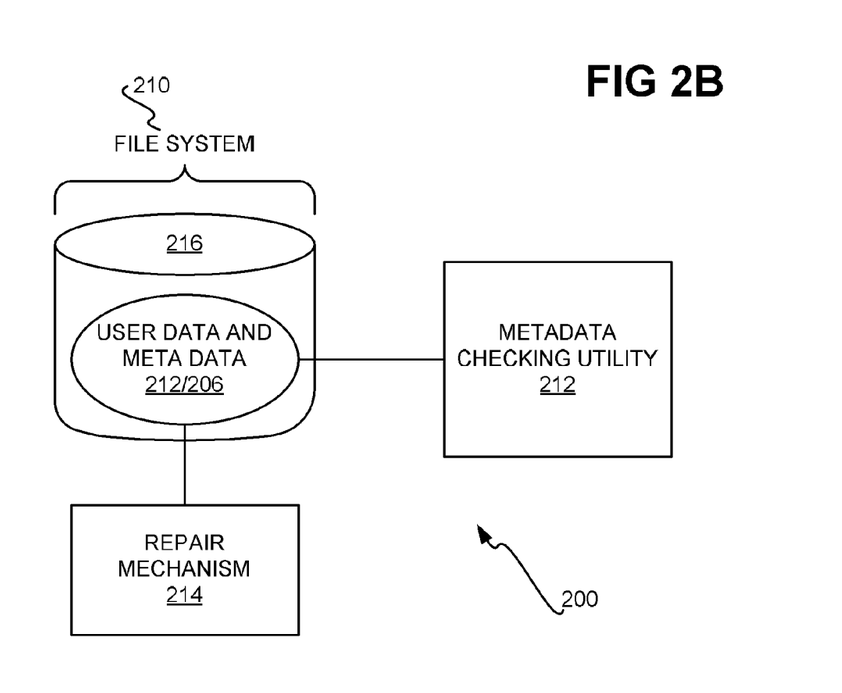

FIGS. 2A and 2B show a system 200, according to varying embodiments of the present disclosure. The system 200 may implement the first system that has been described in relation to FIG. 1. The system 200 in both FIGS. 2A and 2B include a filesystem 210, a metadata checking utility 212, and a repair mechanism 214. The metadata checking utility 212 and the repair mechanism 14 may each be implemented in software, hardware, or a combination of software and hardware.

In FIG. 2A, the user data 202 is logically and physically separate from the metadata 206. For instance, the user data 202 is stored on one or more storage devices 204, whereas the metadata 206 is stored on one or more different storage devices 208. The storage devices 204 and 208 may be hard disk drives, including those organized in different types of arrays and networks, such as storage-area networks (SAN's). In fact, the system 200 of FIG. 2A may be considered a system 200 that includes a SAN, where the filesystem 210 is a SAN filesystem. The filesystem 210 encompasses both the user data 202 and the metadata 206.

By comparison, in FIG. 2B, the user data and the meta data are logically and physically integrated with one another, and are referenced as the user data and metadata 202/206 in FIG. 2B. The user data and metadata 202/206 are stored on the same one or more storage devices 216. The storage devices 216 may be hard disk drives, including those organized in different types of arrays and networks. An example of the filesystem 210 in the context of FIG. 2B in which user data and metadata are not logically and physically separate from one another is the Ext2 filesystem employed by some versions of the LINUX® operating system, where LINUX® is a trademark of Linus Torvalds. Another example of such a filesystem is the NTFS filesystem employed by some versions of the Microsoft® Windows® operating system, which Microsoft® and Windows® are trademarks of Microsoft Corp., of Redmond, Wash. The filesystem 210 in FIG. 2B also encompasses both the user data and metadata 202/206.

In both FIGS. 2A and 2B, the metadata checking utility 212 may be a computer program or a utility that is executed to detect and/or repair corruption within the metadata of the filesystem 210. The metadata checking utility 212 may be or may not be a part of a filesystem computer program or utility, such as the FSCK utility that is provided by some versions of the LINUX® operating system. The metadata checking utility 212 may be periodically run as part of regular maintenance of the filesystem 210 at the system 200, or may be run on-demand, such as when corruption of the metadata of the filesystem 210 is suspected.

In both FIGS. 2A and 2B, the repair mechanism 214 may be a computer program or a utility that is executed to perform the parts of the method 100 of FIG. 1 ascribed to the first system. That is, the repair mechanism 214 extracts the metadata of the filesystem 210 and transmits it to another system, without transmitting the user data of the filesystem 210 and without granting access to the system 200 by this other system. Likewise, the repair mechanism 214 executes a patch provided by this other system to allow the metadata of the filesystem 210 to be repaired.

Those of ordinary skill within the art can appreciate that the system 200 of FIGS. 2A and 2B may and typically does include other components, in addition to and/or in lieu of those depicted in FIGS. 2A and 2B. For instance, components such as processors, memory, and network components are typically found in the system 200, but are not depicted in FIGS. 2A and 2B for illustrative clarity and convenience. The system 200 itself may be implemented over one or more computing devices, and may constitute or include or more service computing devices in one embodiment.

Figure 3:
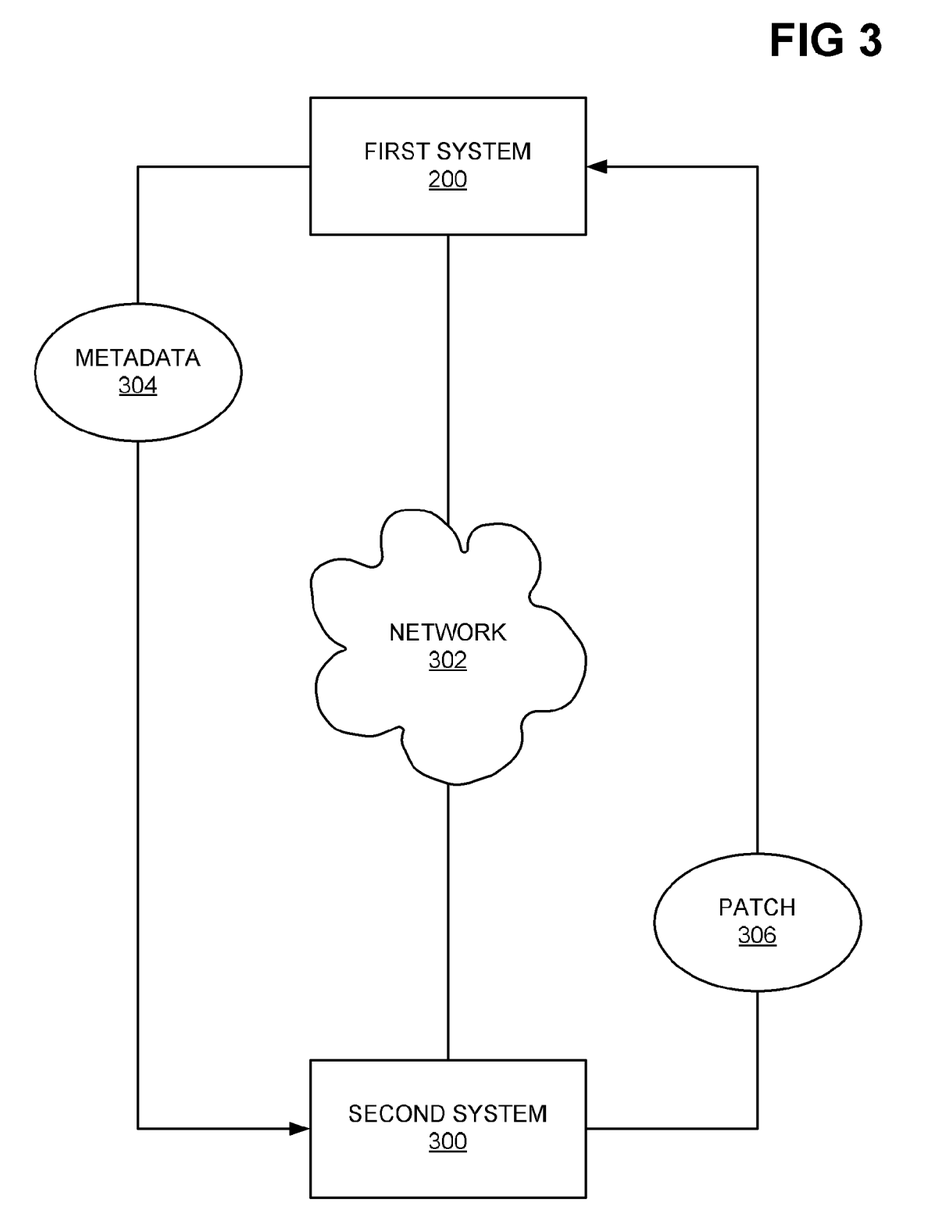
FIG. 3 is a diagram illustratively depicting how a system at which metadata has become corrupted interacts with another system at which the metadata is repaired, according to an embodiment of the present disclosure.

FIG. 3 illustratively depicts how the system 200 interacts with another system at which the patch to repair corrupt metadata is generated, according to an embodiment of the present disclosure. The first system 200 is communicatively connected with such a second system 300 via a network 302. The network 302 may be or include the Internet, intranets, extranets, local-area networks (LAN's), wide-area networks (WAN's), wired networks, wireless networks, and so on. However, while the systems 200 and 300 are communicatively connected to one another, the system 300 may or may not have direct access to the internals of the system 200. However, where applicable, the system 300 may not have access to restricted data, such as part or all of the user data of the filesystem 210 of FIG. 2A or FIG. 2B.

Corrupt metadata 304 is extracted at the first system 200 and transmitted to the second system 300 over the network 302. The corrupt metadata 304 can be extracted at the first system 200 in any conventional or other type of manner, as can be appreciated by those of ordinary skill within the art. The corrupt metadata 304 is debugged at the second system 300 to determine why the metadata 304 became corrupt, and a patch 306 is generated at the second system 300 that upon execution allows the metadata 304 to be repaired so that the metadata 304 is no longer corrupt. Those of ordinary skill within the art can appreciate that debugging of the corrupt metadata 304 can be achieved in any conventional manner, as well as in any other manner. The patch 306 is transmitted from the second system 300 to the first system 200, at which the patch 306 is executed to allow the metadata 304 to be repaired at the first system 200.

It is noted that the metadata 304 and the patch 306 may be transferred between the first and the second systems 200 and 300 in a manner other than by the systems 200 and 300 being communicatively connected to one another via the network 302. For example, the corrupt metadata 304 may be stored on a removable storage device, which is then physically carried to the second system 300. Likewise, the patch 306 may be stored on a removable storage device that is then physically carried to the first system 200.

Detailed Methods and Conclusion

Figure 4:
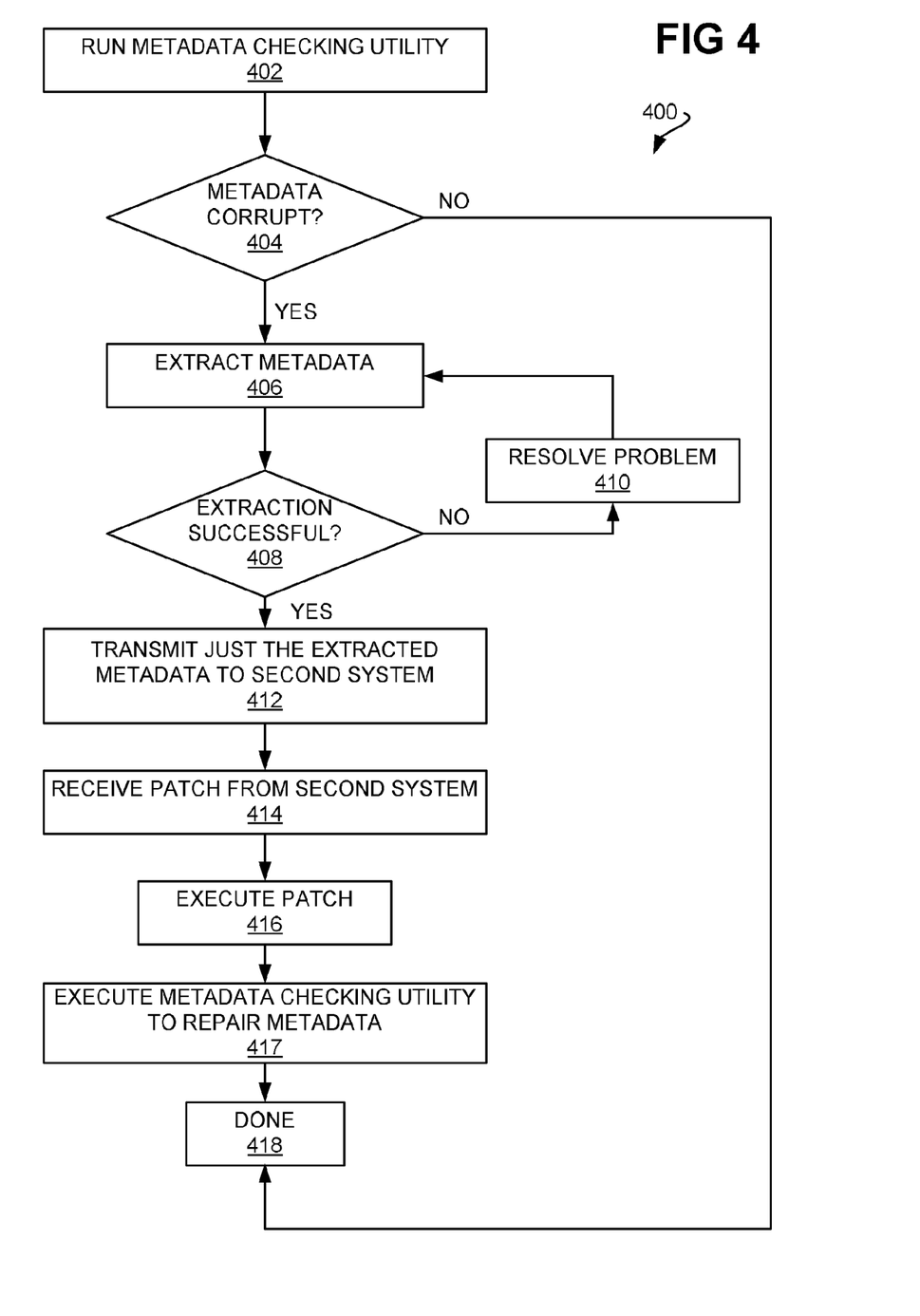
FIG. 4 is a flowchart of a method performed by a first system, and that is more detailed than but consistent with the method of FIG. 1, according to an embodiment of the present disclosure.

FIG. 4 shows a method 400 that is performed at the first system 200, according to an embodiment of the present disclosure. The method 400 is more detailed than but consistent with the parts in the left-hand column of the method 100 of FIG. 1. The method 400 may be implemented at least in part as one or more computer programs stored on a computer-readable medium.

When corruption of the metadata 304 of the filesystem 210 of the first system 200 is suspected, the metadata checking utility 212 is run (402) to verify that the metadata 304 is indeed corrupt. For instance, a user may detect anomalies in the metadata 304, such as incorrect file sizes, and so on, which can signify metadata corruption. If the metadata 304 is not corrupt (404), then the method 400 is finished (418).

However, where the metadata 304 is corrupt (404), then the method 400 extracts the metadata 304 from the filesystem 210 (406). Extraction of the metadata 304 from the filesystem 210 can be achieved in a conventional manner, or in any other manner, as can be appreciated by those of ordinary skill within the art.

Those of ordinary skill within the art can appreciate that due to the manner in which the metadata 304 has been corrupted, as well as due to other alternative or additional factors, the metadata 304 may not be able to be extracted the first time such extraction is attempted. As one example, applications and services may currently have a lock on one or more portions of the metadata 304, such that these locks have to be removed in order for extraction to be performed. As such, if extraction is unsuccessful (408), then the problems preventing extraction are resolved (410), and extraction reattempted (406). Thus, extraction may be an iterative process.

Once extraction of the metadata 304 is successful (408), then the method 400 transmits just the extracted metadata 304 of the filesystem 210 to the second system 300 (412), and thereafter waits for a patch 306 from the second system 300. Once the patch 306 is received from the second system 300 (414), the patch 306 is executed at the first system 200 to allow the metadata 304 of the filesystem 210 to be repaired at the first system 200 (416). For instance, the patch 306 may modify the metadata checking utility 212 so that the utility 212 is able to repair the metadata 304. As such, the metadata checking utility 212 is executed to actually repair the metadata 304 at the first system 200 (417). The method 400 is then finished (418).

The patch 306 may include at least one of two different types of modifications. First, the metadata checking utility 212 may be modified, or updated, so that it is able to repair the metadata 304 so that the metadata is no longer corrupt. Such modifications to the metadata 304 checking utility 212 may be part of the patch 306. Executing the patch 306 in part 416 thus may in this case update the metadata checking utility 212 so that execution of the utility 212 in part 417 repairs the metadata 304 at the first system 200.

Second, the filesystem 210 may have a deficiency that caused it to corrupt the metadata 304. Therefore, the patch 306 can include modifications made to the filesystem 210 so that the metadata 304 does not become corrupt in the future as a result of the particular deficiency in the filesystem. Executing the patch 306 in part 416 may in this case repair the filesystem 210 so that the metadata 304 does not become corrupt in the future in the same way as before.

Figure 5:
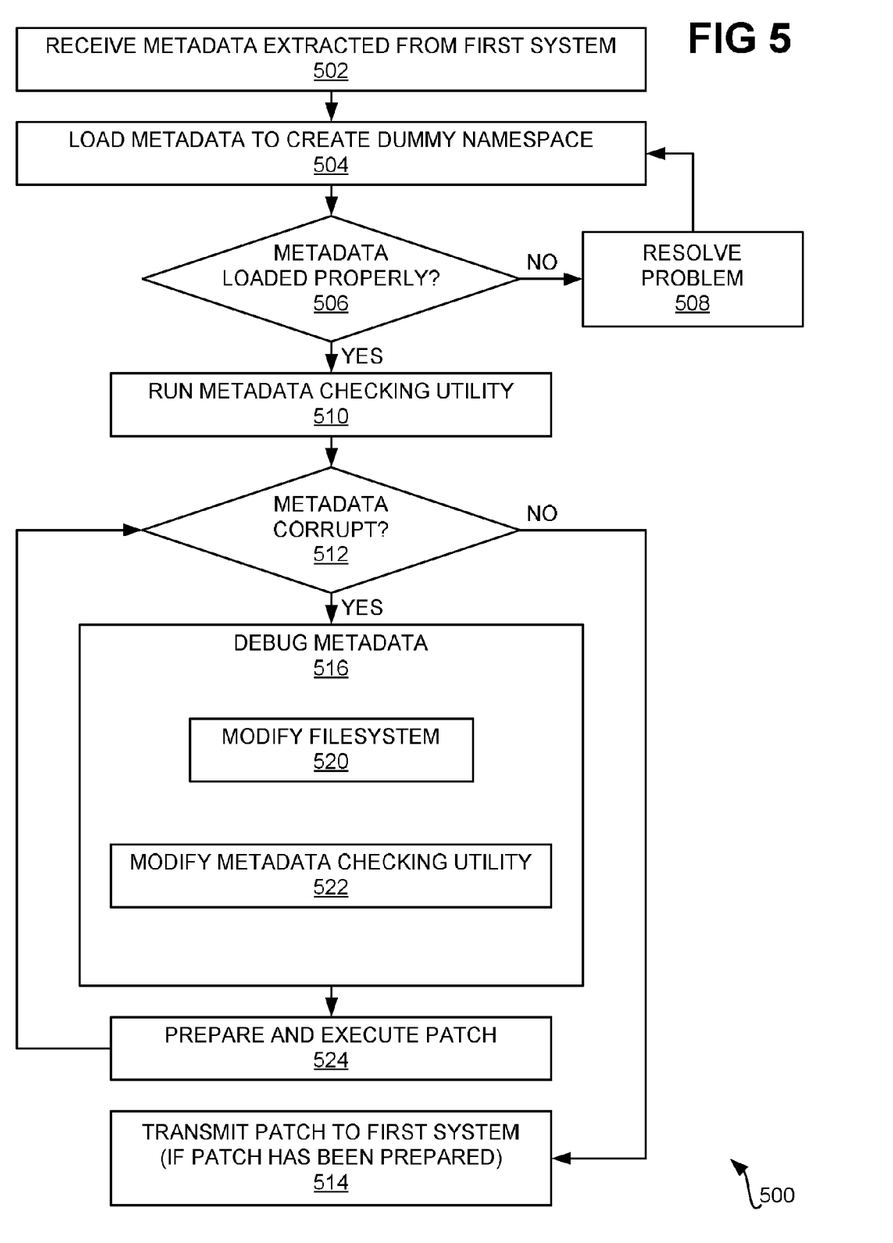
FIG. 5 is a flowchart of a method performed by a second system, and that is more detailed than but consistent with the method of FIG. 1, according to an embodiment of the present disclosure.

FIG. 5 shows a method 500 that is performed at the second system 300, according to an embodiment of the present disclosure. The method 500 is more detailed than but consistent with the parts in the right-hand column of the method 100 of FIG. 1. The method 500 may be implemented at least in part as one or more computer programs stored on a computer-readable medium.

The metadata 304 extracted from the filesystem 210 of the first system 200 is received (502). The metadata 304 is then loaded into the second system 300 to create a dummy namespace (504). The namespace of a filesystem is the collection of all the metadata 304 that describes the actual user data stored within the filesystem. The namespace created in part 504 is a dummy namespace in that there is no actual user data referred to by the metadata 304 within the second system 300. However, loading the metadata 304 into the second system 300 to create such a dummy namespace is beneficial because doing so enables the metadata 304 to be more easily examined and repaired as if it were relating to actual data stored on the second system 300.

The metadata 304 may be loaded at the second system 300 as follows. First, a dummy fileset to which the metadata 304 will be said to relate to is created and populated with data. This fileset does not contain the actual user data of the first system 200, but is created so that the filesystem of the second system 300 believes that there is a corresponding fileset, with associated user data, for the metadata 304. The data with which the fileset is populated can be random or any other type of data in this respect.

The fileset is then taken offline, and a particular logical volume at the second system 300 is extended to encompass this fileset. The extracted metadata 304 is then copied to this logical volume. Once copying has been completed, the fileset can be taken online. The end result is that the filesystem at the second system 300 seemingly appears to have a copy of the filesystem 210 at the first system 200, although in actuality it just has a copy of the metadata 304. The data to which the metadata 304 relates at the second system 300 is not the actual user data of the first system 200, however.

Those of ordinary skill within the art can appreciate that the metadata 304 may not be able to be loaded onto the second system 300 the first time such loading is attempted. As such, if loading is unsuccessful (506), then the problems preventing loading are resolved (508), and loading reattempted (504). Thus, loading may be an iterative process.

Once the metadata 304 has been successfully loaded onto the second system 300 (506), the metadata 304 can be analyzed and repaired at the second system 300 no differently than if the metadata 304 were being analyzed and repaired directly at the first system 200. As such, the metadata checking utility may be run at the second system 300 to verify that the metadata 304 is indeed corrupt (512). If the metadata 304 as initially received and loaded at the second system 300 is not corrupt (512), then the method 500 ends (514) by informing the first system 200 that the metadata 304 received from the first system 200 was not found to be corrupt.

However, if running the metadata checking utility verifies that the metadata 304 received from the first system 200 and loaded at the second system 300 is corrupt (512), then a debugging process is performed (516). As has been described, this debugging process may include modifying the filesystem itself (520), where, for instance, it is concluded after investigation that the filesystem 210 of the first system 200 caused the corruption within the metadata 304. As such, the filesystem is modified to fix the problem. The debugging process can further include the metadata checking utility so that the utility is able to repair the metadata 304 (522).

Once the repair process of part 516 has been completed, a patch 306 is prepared and executed at the second system 300 for testing purposes (524). Preparing the patch 306 includes incorporating modifications made to the filesystem and the metadata checking utility, so that executing the patch 306 at the first system 200, for example, results in the filesystem 210 being updated so that it no longer corrupts the metadata in the same way, and in the metadata checking utility 212 being updated so that it is able to repair the corrupted metadata. The patch 306 may be executed—i.e., tested—at the second system 300, too, to confirm that the patch 306 properly fixes the metadata 304.

The method 500 proceeds from part 524 back to part 512, such that if the patch 306 did in fact properly work, the method 500 proceeds to transmit the patch 306 to the first system 200 (514). As has been described, once the first system 200 receives the patch 306, it executes the patch 306 to correct the problem, including to update the filesystem 210 and/or the metadata checking utility 212, based on the modifications incorporated within the patch 306, and then executes the metadata checking utility 212 as has been updated to repair the corrupt metadata. If the patch 306 executed in part 524, however, did not work as expected, then the repair process is again performed in part 516. That is, the debugging process may be iteratively performed until satisfactory results are obtained.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present disclosure. Therefore, it is manifestly intended that this present disclosure be limited only by the claims and equivalents thereof.

We claim:

1. A method comprising:
    at a first system,
        extracting metadata from a filesystem of the first system, the filesystem including user data and the metadata, the metadata relating to the user data, the metadata being corrupt;
        transmitting just the metadata extracted from the filesystem to a second system;
    at the second system,
        receiving the metadata extracted from the filesystem of the first system;
        debugging the metadata;
        preparing a patch based on debugging of the metadata, such that execution of the patch allows the metadata to be repaired so that the metadata is no longer corrupt;
        transmitting the patch to the first system for execution at the first system to allow the metadata to be repaired at the first system so that the metadata is no longer corrupt at the first system.

2. The method of claim 1, wherein the user data at the first system is inaccessible at the second system, and transmitting just the metadata from the first system to the second system preserves confidentiality of the user data at the first system because none of the user data is transmitted along with the metadata from the first system to the second system.

3. The method of claim 1, wherein a user of the second system is prevented from directly accessing the first system, such that the user is unable to directly repair the metadata at the first system.

4. The method of claim 1, further comprising, at the second system, loading the metadata extracted from the filesystem of the first system to create at the second system a dummy namespace reflecting the metadata extracted from the filesystem of the first system.

5. The method of claim 1, further comprising, at the first system:
    receiving the patch; and,
    executing the patch to repair the metadata at the first system so that the metadata is no longer corrupt at the first system.

6. The method of claim 1, further comprising, at the first system, running a metadata checking utility to verify that the metadata is corrupt.

7. The method of claim 6, further comprising, at the second system, running the metadata checking utility to verify that the metadata is corrupt.

8. The method of claim 1, wherein debugging the metadata comprises modifying the filesystem so that the metadata does not become corrupt in the future for a same reason that the metadata initially became corrupt at the first system, and
    wherein preparing the patch comprises including modifications made to the filesystem, such that execution of the patch at the first system repairs the filesystem at the first system so that the metadata does not become corrupt in the future for the same reason that the metadata initially became corrupt at the first system.

9. The method of claim 1, wherein debugging the metadata comprises modifying a metadata checking utility so that the metadata checking utility is able to repair the metadata,
    wherein preparing the patch comprises including modifications made to the metadata checking utility, such that execution of the patch at the first system updates the metadata checking utility at the first system so that execution of the metadata checking utility repairs the metadata at the first system so that the metadata is no longer corrupt at the first system, and
    wherein after the patch is executed at the first system, the metadata checking utility is executed at the first system to repair the metadata at the first system so that the metadata is no longer corrupt at the first system.

10. A non-transitory computer-readable medium having one or more computer programs stored thereon to perform a method at a first system, the method comprising:
    extracting metadata from a filesystem of the first system, the filesystem including user data and the metadata, the metadata relating to the user data, the metadata being corrupt;
    transmitting just the metadata extracted from the filesystem to a second system at which the metadata is to be debugged without the second system having access to the user data of the filesystem of the first system and without a user of the second system having access to the user data of the filesystem of the first system;
    receiving a patch from the second system; and,
    executing the patch to repair to allow the metadata to be repaired at the first system so that the metadata is no longer corrupt at the first system.

11. The non-transitory computer-readable medium of claim 10, wherein the method further comprises running a metadata checking utility to verify that the metadata is corrupt.

12. The non-transitory computer-readable medium of claim 10, wherein the patch further includes one or more of:
    modifications made to the filesystem, such that execution of the patch repairs the filesystem so that the metadata does not become corrupt in the future for a same reason that the metadata initially became corrupt at the first system; and,
    modifications made to a metadata checking utility, such that execution of the patch updates the metadata checking utility so that the metadata checking utility is able to repair the metadata,
        wherein the method further comprises executing the metadata checking utility as updated to repair the metadata at the first system so that the metadata is no longer corrupt at the first system.

13. A non-transitory computer-readable medium having one or more computer programs stored thereon to perform a method at a second system to remotely repair metadata of a filesystem of a first system, the method comprising:
    receiving metadata extracted from the filesystem of the first system without receiving any user data of the filesystem, the metadata relating to the user data, the metadata being corrupt;
    debugging the metadata;
    preparing a patch based on debugging of the metadata, such that execution of the patch allows the metadata to be repaired so that the metadata is no longer corrupt; and,
    transmitting the patch to the first system for execution at the first system to allow the metadata to be repaired at the first system so that the metadata is no longer corrupt at the first system.

14. The non-transitory computer-readable medium of claim 13, wherein the method further comprises loading the metadata extracted from the filesystem of the first system to create at the second system a dummy namespace reflecting the metadata extracted from the filesystem of the first system.

15. The non-transitory computer-readable medium of claim 13, wherein the method further comprises running a metadata checking utility to verify that the metadata is corrupt.

16. The non-transitory computer-readable medium of claim 13, wherein the debugging the metadata comprises one or more of:
modifying the filesystem so that the metadata does not become corrupt in the future for a same reason that the metadata initially became corrupt at the first system,
wherein preparing the patch comprises including modifications made to the filesystem, such that execution of the patch at the first system repairs the filesystem at the first system so that the metadata does not become corrupt in the future for the same reason that the metadata initially became corrupt at the first system; and,
modifying a metadata checking utility so that the metadata checking utility is able to repair the metadata,
wherein preparing the patch comprises including modifications made to the metadata checking utility, such that execution of the patch at the first system updates the metadata checking utility at the first system so that execution of the metadata checking utility repairs the metadata at the first system so that the metadata is no longer corrupt at the first system.

17. A system comprising:
a filesystem including user data and metadata, the metadata relating to the user data, the metadata being corrupt; and,
a mechanism to extract the metadata from the filesystem and transmit just the metadata to a remote system for debugging, the mechanism further to receive a patch from the remote system and to execute the patch to allow the metadata to be repaired so that the metadata is no longer corrupt,
wherein the user data of the filesystem is inaccessible to the second system and users of the second system are prevented from accessing the user data of the filesystem.

18. The system of claim 17, further comprising a metadata checking utility to verify that the metadata is corrupt, the patch further including modifications made to the metadata checking utility, execution of the patch updating the metadata checking utility such that execution of the metadata checking utility after updating repairs the metadata so that the metadata is no longer corrupt.

19. The system of claim 17, wherein the patch further includes modifications made to the filesystem, such that execution of the patch repairs the filesystem so that the metadata does not become corrupt in the future for a same reason that the metadata initially became corrupt.

20. The method of claim 1, wherein the filesystem defines a methodology by which files of the user data are stored on and retrieved from one or more storage devices, the user data is actual data that users create and/or access, the metadata includes data regarding the user data that is not part of the user data itself, and the metadata comprises filenames of the files encompassing the user data, sizes of the files, and read/write attributes of the files. such that the filesystem defines a directory structure for tracking the files and a path syntax to access the files.

* * * * *